United States Patent
Haas et al.

[15] 3,680,950
[45] Aug. 1, 1972

[54] GRANDJEAN STATE LIQUID CRYSTALLINE IMAGING SYSTEM

[72] Inventors: Werner E. L. Haas, Webster; James E. Adams, Jr., Ontario; John B. Flannery, Jr., Webster, all of N.Y.

[73] Assignee: Xerox Corporation, Stamford, Conn.

[22] Filed: March 15, 1971

[21] Appl. No.: 124,139

[52] U.S. Cl. ............... 350/150, 350/157, 350/160
[51] Int. Cl. .................................................. G02f 1/20
[58] Field of Search ............. 350/147, 150, 157, 160

[56] References Cited

OTHER PUBLICATIONS

Soref; " Solid Facts About Liquid Crystals" Laser Focus, Vol. 6, No. 9, (Sept. 1970) pp. 45– 49

Primary Examiner—David Schonberg
Assistant Examiner—Paul R. Miller
Attorney—James J. Ralabate, Albert A. Mahassel, David C. Petre and Roger W. Parkhurst

[57] ABSTRACT

A system which transforms a liquid crystalline composition having cholesteric optical characteristics from the focal-conic or "undisturbed" texture state into the Grandjean or "disturbed" texture state by an applied A.C. electrical field, and an imaging system wherein such a liquid crystalline member is imaged in a desired image configuration by the A.C. electrical field-induced texture transition system. Such transformed compositions exhibit colors and memory characteristics.

28 Claims, 9 Drawing Figures

PATENTED AUG 1 1972  3,680,950

INVENTORS
WERNER E. L. HAAS
JAMES E. ADAMS JR.
JOHN B. FLANNERY JR.

BY Roger W. Parkhurst
ATTORNEY

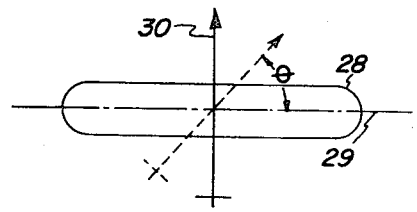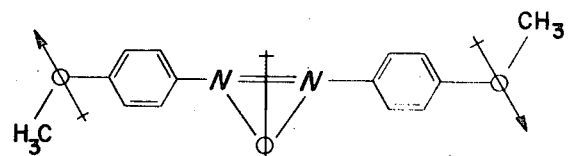
FIG. 5  FIG. 5A
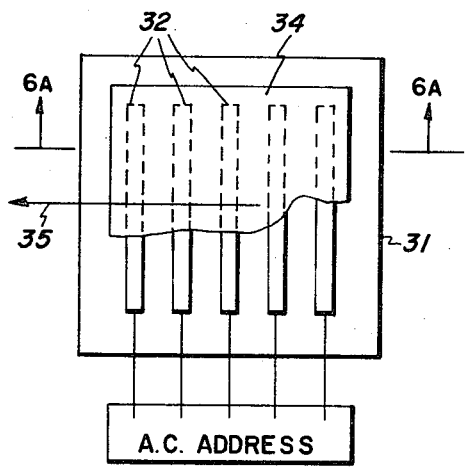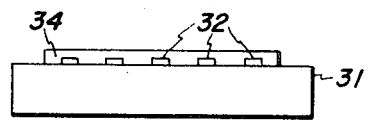
FIG. 6  FIG. 6A
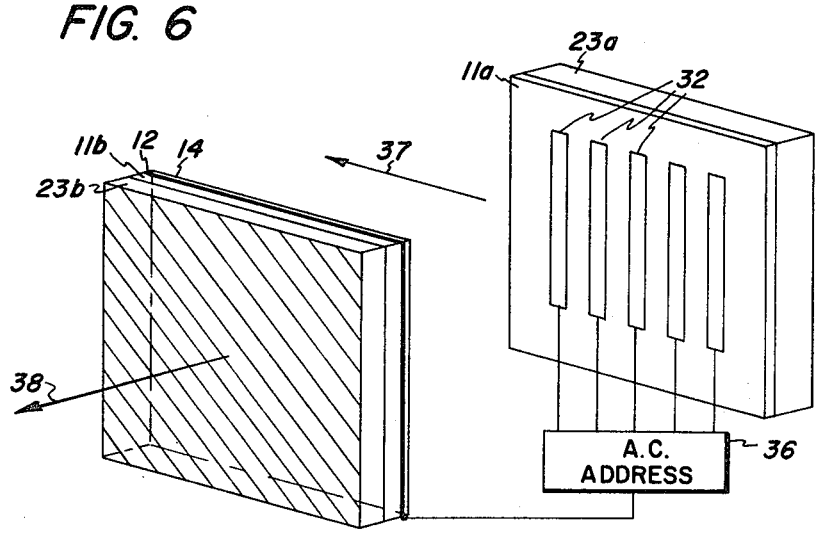
FIG. 7

GRANDJEAN STATE LIQUID CRYSTALLINE IMAGING SYSTEM

BACKGROUND OF THE INVENTION

This invention relates to electro-optic systems, and more specifically to an electro-optic system wherein a liquid crystalline composition having cholesteric optical characteristics is used. Furthermore, this invention includes electro-optic cells and imaging systems embodying the inventive liquid crystalline electro-optic systems.

Recently, there has been substantial interest in the discovery of more useful applications for the class of substances known as "liquid crystals." The name "liquid crystals" has become generic to materials which exhibit dual physical characteristics, some of which are typically associated with liquids and others which are typically unique to solids. Liquid crystals exhibit mechanical characteristics, such as viscosities, which are normally associated with liquids. The optical characteristics of liquid crystals are more similar to those characteristics ordinarily unique to crystalline solids. In liquids or fluids, the molecules are typically randomly distributed and oriented throughout the mass of the material. Conversely, in crystalline solids the molecules are generally rigidly oriented and arranged in a specific crystalline structure. Liquid crystals resemble solid crystals in that the molecules of the liquid crystalline compositions are regularly oriented in a fashion analogous to, but less extensive than, the molecular orientation and structure in a crystalline solid. Many substances have been found to exhibit liquid crystalline characteristics in a relatively narrow temperature range; below that temperature range the substances typically appear as crystalline solids, and above that temperature range they typically appear as isotropic liquids.

Liquid crystals are known to appear in three different mesomorphic forms: smectic, nematic, and cholesteric. In each of these structures, the molecules are typically arranged in a unique orientation. In the smectic structure the molecules are arranged in layers with their major axes approximately parallel to each other and approximately normal to the planes of said layers. In the nematic structure, the major axes of the molecules lie approximately parallel to each other, but the molecules are not organized into definite layers as in the smectic structure. In the cholesteric structure the molecules are arranged in definite layers. Within a given layer, the molecules are arranged with their major axes approximately parallel to each other and parallel to the planes of the layers. The direction of the major molecular axes is angularly displaced from one layer to the next. The direction of the molecular axes of the adjacent layers traces out a helical path. The cholesteric structure originally derived its name from the fact that materials exhibiting the cholesteric liquid crystalline mesophase structure typically are molecules which are derivatives of cholesterol or which are shaped very similarly to molecules of cholesterol.

Liquid crystals have been shown to be sensitive to various stimuli such as electrical fields, as disclosed, for example, in copending application Ser. No. 646,532, filed June 16, 1967; copending application Ser. No. 821,565, filed May 5, 1969; copending application Ser. No. 849,418, filed Aug. 12, 1969; copending application Ser. No. 4,644, filed Jan. 21, 1970; and French Pat. No. 1,484,584. Heilmeier, G. H., and Goldmacher, J. E., Appl. Phys. Letters 13, 4, 132 (1968), and Soref, R. A., "Thermo-Optic Effects in Nematic-cholesteric Mixtures," J. Applied Physics, Vol. 41, No. 7, June, 1970, pp. 302–3026, disclose electrical erasure of induced mesophase states in nematic-cholesteric mixtures.

However, in new and growing areas of technology such as liquid crystalline electro-optic and imaging systems, new methods, apparatus, compositions, and articles of manufacture continue to be discovered for the application of the new technology in surprising new and advantageous modes. The present invention relates to a new system for transforming a liquid crystalline composition from its focal-conic state to the Grandjean texture state by the application of A.C. electrical fields, and imaging systems wherein a liquid crystalline member is imaged by the aforementioned texture transition system.

SUMMARY OF THE INVENTION

It is, therefore, an object of this invention to provide a novel electro-optic system.

It is another object of this invention to provide a novel liquid crystalline imaging system.

It is another object of this invention to transform a liquid crystalline composition from its focal-conic texture state to its Grandjean texture state by an applied A.C. electric field.

It is another object of this invention to provide texture transition systems and imaging systems exhibiting reflective colors.

It is another object of this invention to provide an imaging system using a liquid crystalline composition in the optically uniaxial state.

It is another object of this invention to provide an imaging system using the optical activity of a liquid crystalline material.

It is another object of this invention to provide an imaging system making use of the reflective circular dichroic characteristics of a liquid crystalline material.

It is yet another object of this invention to provide liquid crystalline texture transition and imaging systems using compositions having cholesteric optical characteristics.

It is still another object of this invention to provide liquid crystalline texture transition and imaging systems using mixtures of cholesteric and nematic and/or smectic liquid crystalline materials.

The foregoing objects and others are accomplished in accordance with this invention by providing a layer of liquid crystalline composition having cholesteric optical characteristics and providing said layer of liquid crystalline material in its focal-conic or "undisturbed" texture state, and applying an A.C. electrical field whereby the layer of liquid crystalline material is transformed into the Grandjean or "disturbed" texture state. The invention also includes imaging systems wherein such liquid crystalline members are imaged in a desired image configuration by the A.C. electrical field-induced texture transition system. Such transformed compositions exhibit colors and memory characteristics.

BRIEF DESCRIPTION OF THE DRAWINGS

For a better understanding of the invention as well as other objects and further features thereof, reference is made to the following detailed disclosure of preferred embodiments of the invention taken in conjunction with the accompanying drawings thereof, wherein:

FIG. 5 is a partially schematic representation of an elongate, polar molecule illustrating its major molecular axis and its permanent dipole moment.

FIG. 5A is a geometric, structural formula of a typical polar molecule, illustrating its permanent dipole moments.

FIG. 6 is a partially schematic, top view of a novel electro-optic cell embodying the present invention.

FIG. 6A is a partially schematic, cross-sectional view of the novel electro-optic cell illustrated in FIG. 6.

FIG. 7 is a partially schematic, isometric view of an electro-optic cell embodying the present invention, much like the cell illustrated in FIG. 6 and 6A, wherein said cell is viewed between polarizers.

DESCRIPTION OF THE PREFERRED EMBODIMENTS

Figure 1:
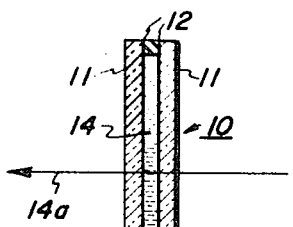
FIG. 1 is a partially schematic, cross-sectional view of an electro-optic cell embodying the present invention.

In FIG. 1 a typical electro-optic liquid crystalline cell 10, sometimes referred to as an electroded sandwich cell, is shown embodying the present invention, wherein a pair of transparent plates 11 having substantially transparent conductive coating 12 upon the contact surface thereof, comprise a parallel pair of substantially transparent electrodes. Cells wherein both electrodes are substantially transparent is preferred where the imaging member is to be viewed using transmitted light; however, a liquid crystalline cell may also be viewed using reflected light thereby requiring only a single transparent electrode while the other may be opaque. The transparent electrodes are separated by spacing-gasket member 13 which includes voids which form one or more shallow cups which contain the liquid crystalline material in a film or layer which comprises the active element of the electro-optic cell. In the present invention the layer of liquid crystalline material comprises a composition having cholesteric optical characteristics. An electrical field is created between the electrodes by an external circuit 15 which typically comprises a relatively high frequency A.C. electrical potential source 16 which is connected across the two electrodes through leads 17. The circuit 15 may also contain any suitable switching means that is desired.

In the advantageous system of the present invention it has been discovered that when the aforementioned liquid crystalline composition is provided in a layered configuration, and the material is provided in its focal-conic, or "undisturbed" texture state, that the application of A.C. electrical fields to the layer of liquid crystalline composition causes an A.C. electrical field-induced texture transition to occur wherein the material initially in its focal-conic or "undisturbed" texture state is transformed into the Grandjean or "disturbed" texture state.

The focal-conic texture state is predominately characterized by its highly diffuse light scattering appearance caused by a distribution of small, birefringent domains. This texture has no single optic axis. The grandjean texture state is typically characterized by the selective reflection of incident light around a wavelength $\lambda_0$ where $\lambda_0$ equals $2np$ where $n$ equals the index of refraction of the layer of liquid crystalline composition, and $p$ equals the pitch of the liquid crystalline composition. The pitch is the distance between molecular layers having equivalent orientation in compositions having cholesteric liquid crystalline characteristics. The Grandjean state is additionally characterized by optical activity for wavelengths of incident light away from $\lambda_0$. Where $\lambda_0$ is in the visible spectrum, as in the present invention, the liquid crystalline composition layer appears to have the color corresponding to $\lambda_0$. The Grandjean texture state is sometimes referred to as the "disturbed" texture state.

Although the focal-conic texture is also characterized by selective reflection, the predominate characteristic, as stated above, is the diffuse scattering of incident light in the visible spectrum, whether the $\lambda_0$ of liquid crystalline films in the focal-conic texture is in the visible spectrum or not. Even when the $\lambda_0$ of such films is outside the visible spectrum, the appearance of the focal-conic texture is typically milky-white (i.e., white light scattering). The focal-conic texture is sometimes referred to as the "undisturbed" texture state.

The layer of liquid crystalline composition may be provided in its focal-conic or "undisturbed" texture state by any suitable means. For example, liquid crystalline compositions having cholesteric liquid crystalline characteristics may be provided in the focal-conic texture state by the application of D.C. electrical fields or by low frequency A.C. electrical fields, for example as described in copending application Ser. No. 867,593, filed Oct. 20, 1969; or, such liquid crystalline compositions may be provided in the focal-conic texture state by heating the composition to at least about the liquid isotropic transition temperature of the material, as disclosed, for example, in copending application Ser. No. 104,348, filed Jan. 6, 1971; the entire disclosures of both of these applications are hereby incorporated by reference in the present specification.

In addition to the advantageous selective reflection which is characteristic of the A.C. field-induced Grandjean texture in the present invention, the layers of liquid crystalline material provided in the Grandjean state by the A.C. field induction technique of the present invention are desirable for use in various electro-optic and imaging systems because of the optically uniaxial character of the induced texture state, the optical activity of the liquid crystalline material, and the characteristic circular dichroism of the liquid crystalline material. Compositions transformed to the Grandjean texture state by the inventive system exhibit memory characteristics and typically maintain the Grandjean state indefinitely. These advantages of the present invention, and imaging systems using these advantageous characteristics, are discussed below herein.

Figure 2:
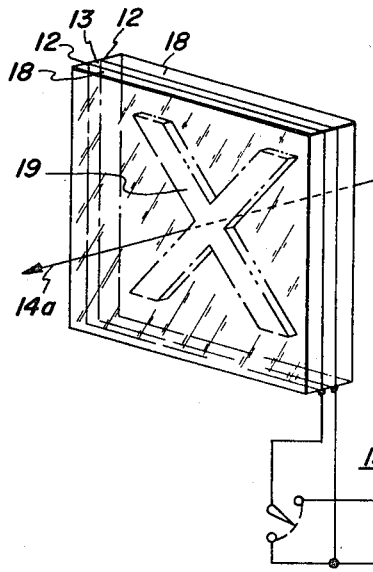
FIG. 2 is a partially schematic, isometric view of an electro-optic imaging cell embodying the present invention wherein the desired image is defined by the shape of the liquid crystalline material as confined by the shape of the spacing-gasket member.

In FIG. 2 an embodiment of the electro-optical cell described in FIG. 1 is shown with the desired image defined by the shape of the void areas in the spacer gasket 13. As before, transparent electrodes 18 are separated by the spacer 13; but only the desired image area 19 comprises the liquid crystal film or layer. In this embodiment the entire inner faces of the transparent electrodes comprise substantially transparent conductive coating 12 and the conductive coatings are electrically connected to the external circuit 15. In operation there is an electrical field across the entire area of the spacer 13, however the image caused by the A.C. electrical field-induced texture transition in the liquid crystalline film causes imaging to occur only in the area 19 where the liquid crystalline film is present. Again here, depending on whether the desired image is to be viewed in transmitted or reflected light, both, or only one of the electrodes, respectively, may be transparent.

Figure 3:
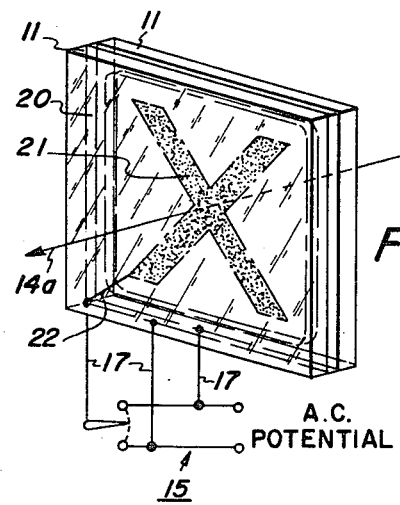
FIG. 3 is a partially schematic, isometric view of an electro-optic imaging cell embodying the present invention wherein the desired image is defined by the shape of at least one of the electrodes.

In FIG. 3 another preferred embodiment of the electro-optic cell described in FIG. 1 is shown wherein the desired image is defined by the shape of an electrode, and therefore by the shape of the electrical field created by that electrode. This electro-optic imaging cell comprises transparent plates 11 separated by spacer gasket 13 having void area 20 filled with liquid crystalline material, with that area comprising substantially the entire area of spacer gasket 13. The desired image is defined by the shape of a substantially transparent conductive coating shown at 21, which is affixed to the inner surface of one or more of the transparent support plates 11, and is typically affixed only in the desired image configuration. The embodiment illustrated in FIG. 3 shows only one of the two electrodes in image configuration; however, it will be understood by those skilled in the art that both electrodes could easily be made in a matched, congruent pair to define the same desired image. When the single image electrode configuration is used, the second electrode will typically comprise transparent plate 11 with substantially transparent conductive coating 12 throughout the entire area of the inner surface of the transparent plate 11. It is noted that a very thin, or substantially invisible conductor 22 is typically used in this embodiment to electrically connect the imagewise electrode to external circuit 15 which is also connected to the conductive coating of the opposite electrode. In operation this embodiment produces the advantageous A.C. electrical fields only in areas where there are parallel electrodes, i.e., between the electrode in the desired image configuration and the opposite electrode, whether or not the latter is also in a desired image configuration. Again here, one of the electrodes may be opaque if it is desired to observe the imaged member in reflected light rather than transmitted light.

In addition, where the desired image is defined by the shape of one or more electrodes, an electrode may be shaped in the configuration of the background area of the desired image, and an imagewise electrode and such a complementary background electrode may be coplanar and insulated from one another by a space or some insulating material. Such a coplanar pair of electrodes may be operated simultaneously as a substantially full-area electrodes.

Figure 4:
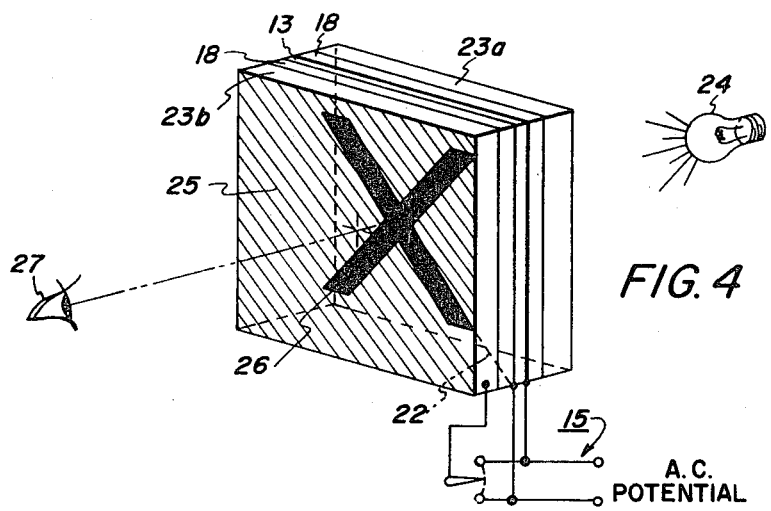
FIG. 4 is a partially schematic, isometric view of a typical electro-optic imaging cell embodying the present invention wherein said cell is viewed between polarizers.

In FIG. 4 an electro-optic imaging cell comprising a pair of substantially transparent electrodes 18 sandwiching the spacer 13 containing a liquid crystalline film is shown being observed between polarizers 23. As described earlier herein, liquid crystalline materials having cholesteric liquid crystalline characteristics, when provided in the focal-conic texture state are diffusely light scattering in either transmitted or reflected light. This light scattering is observable even when such a material is observed between polarizers and even crossed polarizers. However, when the liquid crystalline material is transformed to its Grandjean texture state by the application of the advantageous A.C. electrical fields of the present invention, the portions of the liquid crystalline film in the transformed Grandjean texture state are typically selectively reflective and dispersive, and incident light is therefore not as readily transmitted when such material is observed between polarizers, and especially crossed polarizers. As illustrated in FIG. 4, light from source 24 is plane polarized by polarizer 23a. In traversing the liquid crystalline film it remains plane polarized in the transformed (Grandjean) areas 26, and ceases to be plane polarized in the non-transformed (focal-conic) areas 25. In passing through polarizer 23b, which is adjusted to a suitable angle, the Grandjean areas 26 appear dark if monochromatic light is used, or appear colored if white light is used. The focal-conic areas 25 appear bright in either case.

Although the embodiment of the advantageous system of the present invention illustrated in FIG. 4 shows a liquid crystalline film being observed between polarizers, it will be appreciated that any other means for enhancing the image or non-image areas may perform a function similar to that of the polarizers in the illustrated embodiment. For example, in addition to polarizers, edge-lighting systems, optical filter systems, or any other suitable means may be used to enhance the quality of the desired image. It is therefore clear that any desired image may be created in dark-on-light, light-on-dark, colored-on-light, light-on-colored, colored-on-dark, or dark-on-colored image-background combinations.

In the electro-optic liquid crystalline cells described herein the electrodes may comprise any suitable transparent conductive material. Typical suitable transparent, conductive electrodes include glass or plastic substrates having substantially transparent and continuously conductive coatings of conductors such as tin, indium oxide, aluminum, chromium, tin oxide, or any other suitable conductor. These substantially transparent conductive coatings may be evaporated or otherwise applied onto the transparent substrate. NESA glass, a tin oxide coated glass manufactured by the Pittsburgh Plate Glass Company, is a commercially available example of a typical transparent, conductive electrode material.

The spacer 13 which separates the transparent electrodes and contains the liquid crystal film between said electrodes, is typically chemically inert, transparent, substantially insulating and has appropriate dielectric characteristics. Materials suitable for use as insulating spacers include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate, and mixtures thereof.

Such spacers, which also approximately define the thickness of the imaging layer or film of liquid crystals, are preferably of a thickness in the range of about 10 mils or less. Optimum results are typically attained with spacers in the thickness range between about one-fourth mil and about 5 mils.

The layer or film of liquid crystalline composition 14 comprises a liquid crystalline composition having cholesteric optical properties. Preferred liquid crystalline compositions having cholesteric optical properties comprise mixtures of a cholesteric liquid crystalline material and a material selected from the group consisting of: nematic liquid crystalline materials, smectic liquid crystalline materials, and mixtures thereof. Mixtures of liquid crystals can be prepared in organic solvents such as chloroform, petroleum ether, methylethyl ketone and others, which are typically subsequently evaporated from the mixture thereby leaving the liquid crystalline mixture. Alternatively, the individual liquid crystals of the liquid crystalline mixture can be combined directly by heating the mixed components above the isotropic transition temperature. Such solutions or melts of liquid crystals are particularly suitable for use in providing layers of liquid crystals on surfaces.

The cholesteric component of the liquid crystalline material or mixture may comprise any suitable cholesteric liquid crystal, mixture or composition comprising liquid crystals, or composition having cholesteric liquid crystalline characteristics. Cholesteric liquid crystals suitable for use in the present invention include derivatives from reactions of cholesterol and inorganic acids; for example, cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; cholesteryl formate; cholesteryl docosonoate; cholesteryl chloroformate; cholesteryl propionate; cholesteryl acetate; cholesteryl valerage; cholesteryl vaccenate; cholesteryl linoleate; cholesteryl linolenate; cholesteryl oleate; cholesteryl erucate; cholesteryl butyrate; cholesteryl caprate; cholesteryl laurate; cholesteryl myristate; cholesteryl clupanodonate; ethers of cholesterol such as cholesteryl decyl ether; cholesteryl lauryl ether, cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy) ethyl carbonate; cholesteryl-2-(2-butoxyethoxy) ethyl carbonate; cholesteryl 1-2-(2-methoxyethoxy) ethyl carbonate; cholesteryl heptyl carbamate; and alkyl amides and aliphatic secondary amines derived from $3\beta$-amino-$\Delta$ 5-cholestene and mixtures thereof; peptides such as cholesteryl poly-$\gamma$-benzyl-$l$-gluamate derivatives of beta sitosterol such as sitosteryl chloride; and active amyl ester of cyanobenzylidene amino cinnamate. The alkyl groups in said compounds are typically saturated or unsaturated fatty acids, or alcohols, having less than about 25 carbon atoms, and unsaturated chains of less than about five double-bonded olefinic groups. Aryl groups in the above compounds typically comprise simply substituted benzene ring compounds. Any of the above compounds and mixtures thereof may be suitable cholesteric liquid crystalline materials in the advantageous system of the present invention.

Smectic liquid crystalline materials are suitable for use as components of the liquid crystalline composition in the present invention and such smectic liquid crystal materials include: n-propyl-4'-ethoxy biphenyl-4-carboxylate; 5-chloro-6-n-heptyloxy-2-naphthoic acid; lower temperature mesophases of cholesteryl octanoate, cholesteryl nonanoate, and other open-chain aliphatic esters of cholesterol with chain length of seven or greater; cholesteryl oleate; sitosteryl oleate; cholesteryl decanoate; cholesteryl laurate; cholesteryl myristate; cholesteryl palmitate; cholesteryl stearate; 4'-n-alkoxy-3'-nitrobiphenyl-4-carboxylic acids' ethyl-p-azoxy-cinnamate; ethyl-p-4-ethoxybenzylidene-aminocinnamate; ethyl-p-azoxybenzoate; potassium oleate; ammonium oleate; p-n-octyloxy-benzoic acid; the low temperature mesophase of 2-p-n-alkoxy-benzylideneamino-fluorenones with chain length of seven or greater; the low temperature mesophase of p-(n-heptyl) oxybenzoic acid; anhydrous sodium stearate; thallium (I) stearate; mixtures thereof and others.

Nematic liquid crystalline materials suitable for use as components of the liquid crystalline composition in the advantageous system of the present invention include: p-azoxyanisole, p-azoxyphenetole, p-butoxybenzoic acid, p-methoxy-cinnamic acid, butyl-p-anisylidene-p-aminocinnamate, anisylidene para-aminophenylacetate, p-ethoxy-benzalamino-a-methyl-cinnamic acid, 1,4-bix(p-ethoxy benzylidene) cyclohexanone, 4,4'-dihexyl-oxybenzene, 4,4'-diheptyloxybenezene, anisal-p-amino-azo-benzene, anisaldazine, a-benzeneazo- (anisal- $\alpha$ -naphthylamine), n,n'-nonoxybenze-taluidine; anils of the generic group (p-n-alkoxy-benzylidene-p-n-alkylanilines), such as p-methoxy benzylidene p-n-butylaniline, mixtures of the above and many others.

The above lists of material exhibiting various liquid crystalline phases are not intended to be exhaustive or limiting. The lists disclose a variety of representative materials suitable for use in the electro-optic liquid crystalline composition or mixture which comprises the active element in he advantageous system of the present invention.

Preferred liquid crystalline compositions having cholesteric optical properties, which suitable for use in the present invention, comprise two components: a cholesteric component, and a nematic and/or smectic component. The electro-optic composition comprising a mixture of these two components is believed to maintain its cholesteric liquid crystalline characteristics insofar as it exhibits the focal-conic and Grandjean texture states, selectively reflects or disperses light, and exhibits optical activity and circular dichroism. However, the nematic and/or smectic component in the mixture facilitates alignment of the molecules in the transformed Grandjean texture state and contributes to the optical uniaxiality in the transformed state. The various characteristics of the advantageous liquid crystalline composition are typically observed in the mixture in proportion to the amounts by weight of the cholesteric, and nematic and/or smectic components, respectively.

FIGS. 5 and 5A represent molecules having particularly preferred characteristics for use in the electro-optic composition in the present invention. FIG. 5 schematically represents a molecule, cigar-shaped form 28, having major molecular axis 29 and permanent dipole moment 30. It has been found that molecules of liquid crystalline materials which have permanent and/or induced dipole moments approximately perpendicular to the major axes of said molecules, are particularly preferred for use in the liquid crystalline composition used in the advantageous system of the present invention. The net dipole moment, comprises the vector sum of the permanent dipole moment of a given molecule and any electrical field induced dipole moment. Of course, depending on the molecular structure of each individual molecule, the acute angle between the major axis of the molecule and the permanent dipole moments, may vary from one compound to another. In the advantageous system of the present invention, the acute angle $\theta$ (see FIG. 5) is typically in the range between about 45° and about 90°. FIG. 5A schematically illustrates the structural formula of a representative nematic molecule, p-azoxyanisole, whose net dipole moment can be seen to be approximately perpendicular to the major axis of the molecule which is coaxial with the nitrogen-nitrogen double bond. These particularly preferred molecules having net dipole moments approximately perpendicular to the major axis of the molecule are believed to be the driving force in the advantageous focal-conic to Grandjean texture transition system of the present invention. It is believed that when the advantageous A.C. fields of the present invention are placed across the thickness of the layer of liquid crystalline composition comprising such molecules, that the net dipole moment of the advantageous molecules is approximately perpendicular to the major axis of each molecule. The effect of such molecules in the A.C. electrical field is believed to be to facilitate the alignment of all the molecules in the liquid crystalline composition into the transformed Grandjean texture state. In this state, the molecules are aligned with their major molecular axes approximately perpendicular to the direction of the electrical field.

Although the proposed mechanism of the present invention as described above is somewhat speculative, it is believed to be consistent with all of the present knowledge of the inventive system. However, when the actual results of the inventive system are compared with previously observed behaviors of cholesteric liquid crystalline materials, nematic liquid crystalline materials smectic liquid crystalline materials, and mixtures thereof, in electrical fields, it is found that the presently observed result is highly surprising and unexpected. For example, previously, when cholesteric liquid crystalline materials were placed in electrical fields, and especially electrical fields provided by D.C. or low frequency A.C. sources, it was observed that the cholesteric liquid crystalline material tended to assume its focal-conic texture state, not the Grandjean texture state provided in the advantageous system of the present invention. This texture transformation is described, for example, in copending application Ser. No. 867,593, filed Oct. 20, 1969. If higher electrical field strengths were used with cholesteric materials, the liquid crystalline material was observed to change from the cholesteric liquid crystalline mesophase into the nematic mesophase state, and typically become optically clear. This effect is described, for example, in copending application Ser. No. 821,565, filed May 5, 1969. Nematic liquid crystalline materials typically reacted to electrical fields by assuming the so called "dynamic scattering" state wherein an ionic current flow is set up through the liquid crystalline material, and the liquid crystalline material assumes a non-selective light scattering appearance. In stark contrast to the aforementioned systems, the advantageous system of the present invention causes a layer of liquid crystalline composition having cholesteric optical characteristics, initially in the focal-conic texture state, to revert to the Grandjean texture state when subjected to A.C. electrical fields.

In the advantageous system of the present invention the A.C. fields are operated at frequencies which are sufficiently high to suppress the appearance of random, small, birefringent domains like those found in the dynamic scattering state; at such frequencies ion flow within the liquid crystalline material is insignificant. The electrical field strengths provided by such A.C. fields are typically of strength in the range between about $10^3 V_{rms}/cm$. and about $10^6 V_{rms}/cm$.

As already discussed above herein, there are a number of differences between the initial focal-conic state and the A.C. field induced Grandjean state provided by the system of the present invention. The unique optical characteristics of the induced Grandjean state make the inventive system suitable for use in a number of electro-optic cells or display devices. For example, the cells already described herein in conjunction with FIGS. 1—4 are suitable for use in various modes as described below.

Electro-optic cells such as the ones illustrated in FIGS. 1—3 are particularly suitable for use in cells and display devices making use of the visible reflection colors which are characteristic of the induced Grandjean plane texture. The Grandjean plane texture typically selectively reflects visible colors when illuminated with white light. The selective color typically changes with the angle of incidence of the light and the angle of reflection. The observed color also depends upon the pitch of the helical structure of liquid crystal compositions having cholesteric liquid crystalline characteristics. Where the pitch in the cholesteric system is large, the color is typically in the infrared spectral range, and where the pitch is very small the color is typically in the U.V. spectral range. Intermediate pitch values typically produce the advantageous reflection colors in the visible spectrum. If, instead of white light, monochromatic light of suitable wavelengths is used as the input, the cells of the present invention become dark instead of exhibiting the highly desirable reflective colors. It is also noted that while compositions comprising cholesteric and nematic and/or smectic materials generally maintain cholesteric liquid crystalline optical characteristics, the pitch of the composition as a whole is effected by the relative amounts of the cholesteric component and the nematic and/or smectic component, respectively, and varying the relative amounts of said components can change the observed reflective color even where the angles of incidence and observation remain constant. Of course this variable simply adds increased flexibility to electro-optic cells and display systems utilizing the advantageous system of the present invention in the reflective mode.

Electro-optic cells or displays such as the one illustrated in FIG. 4 are suitable for use in the transmission mode making use of the induced optically uniaxial state provided by the system of the present invention. In such cells the direction of the electrical field provided by the A.C. electrical field address system is parallel to the direction of light propagation, and in the induced Grandjean state this is the direction of the optic axis of the liquid crystalline material. When a cell such as the one in FIG. 4 is viewed between polarizers, without the advantageous A.C. electrical fields, the cell is observed to be bright because of the diffuse light scattering caused by the random alignment of birefringent domains which are characteristic of the focal-conic state. When the advantageous A.C. field of the present invention is applied, the induced Grandjean state assumes a molecular arrangement having a singular optic axis parallel to the electrical field, so that the effect of the polarizers at a suitable angle is to cut off or drastically reduce the amount of light transmitted to an observer 27 in the path of the optic axis. When viewed in monochromatic light of certain wavelengths the transformed field of view in the cell is typically dark. In white light the transformed field of view typically becomes uniformly colored, with the hue depending upon the angle between the polarizer and analyzer. The hue is a result of dispersive optical activity characteristic of the Grandjean texture. The dependence of the hue on the relative position of polarizer and analyzer gives the inventive system another degree of freedom whereby color display cells may be controlled.

Another electro-optic system using the advantageous characteristics of the present invention is described in FIG. 6 wherein a substrate 31, which is typically transparent, has electroded stripes 32 spaced on its surface, and said electroded stripes are electrically connected to a suitable A.C. electrical address system which is capable of providing the advantageous A.C. fields of the present invention between all or each pair of the electroded stripes. This electroded stripe grid is overcoated with the advantageous layer of liquid crystalline composition having cholesteric optical characteristics. FIG. 6A illustrates the striped electrode device of FIG. 6 in a cross-sectional view. In the device illustrated in FIGS. 6 and 6A, the A.C. electrical field induced optically uniaxial state may be induced so that the optic axis in the induced state is perpendicular to the grid of electroded stripes and parallel to the plane of the surface of the substrate 31, as illustrated by the arrow 35. FIG. 7 illustrates in an exploded isometric view an electro-optic cell making use of the electroded stripe grid described in FIG. 6 and 6A in a cell much like the ones illustrated in FIGS. 1–4. In FIG. 7 the striped electrodes 32 are coated on the surface of the substantially transparent member 11a which is on one side of the layer 14, which contains the liquid crystalline composition, and a second, full area electrically conductive surface 12 is on the surface of substantially transparent member 11b and located on the opposite side of the layer 14 from the grid of electrode stripes 32. All of these elements just described are provided between polarizers 23a and 23b, and the electroded striped grid as well as the full area electrode 12 are electrically connected to a suitable A.C. electrical address system 36. In operation the electro-optic cell of FIG. 7 may have the advantageous A.C. electrical fields provided only between the electroded stripes to provide the liquid crystalline material in its induced uniaxial state with the optic axis perpendicular to the electroded stripes and parallel to the plane of surface 11a as illustrated by arrow 37. Or, in another mode, the advantageous A.C. electrical field may be provided between the electroded stripes on one side of the layer of liquid crystalline composition, and the full area electrode 12 on the other side of said composition, thereby providing the composition in the induced uniaxial state with the optic axis perpendicular to the plane of the layer of liquid crystalline material as illustrated by arrow 38. When cells such as the one illustrated in FIG. 6, 6A and 7 (using only the electrode stripes of the cell of FIG. 7), and preferably with the polarizers having their planes of polarization crossed vis-a-vis each other and making angles of about 45° with the direction of the electrical fields between the electroded stripes, changes in the transmission characteristics of the liquid crystalline composition become visible because the birefringence of the initial and induced states change from random to oriented, respectively. It is therefore clear that the cell illustrated in FIG. 7 has the capability of being used in all the modes suitable for use in conjunction with the cells in FIGS. 1–4, and additionally, this cell may be used in the differentially birefringent mode making use of only the coplanar electroded stripes.

In still another mode, the advantageous cells illustrated in conjunction with the present invention may make use of the circular dichroism of the A.C. field induced Grandjean state. The initial focal-conic texture state does not exhibit dichroism. With the help of circular polarizers the difference between the non-dichroic focal-conic texture state, and the circular dichroic Grandjean state, may be used to produce optical contrast in cells and displays like those described herein.

While much of the description of the invention has been directed to the generic process and advantageous derivatives thereof, one of the most useful applications of the inventive system is in imaging or display devices and systems. For example, the electro-optic cells illustrated in FIGS. 2–4 have been shown with specific alpha-numeric images in order to explain some specific embodiments of imaging systems embodying the advantageous system of the present invention. However, the imaging applications of the inventive system are not limited to such devices. In still other embodiments, the electrodes which provide the advantageous A.C. electrical field across the layer of liquid crystalline composition may be provided in a X—Y matrix grid which permits the address of any element in the grid at any desired time. Similarly, display systems may use dot or line matrices which may be individually addressed to provide any desired image on a grid of such dots or lines. In still further applications, even more flexible address systems, such as stylus writing address systems, may be used to provide the advantageous A.C. electrical fields across the layer of liquid crystalline composition in virtually any desired image pattern. In still other embodiments of imaging cells using the inventive system a plurality of individual cells may be arranged in coplanar and/or multiplanar configurations wherein one or more of the individual cells may be activated in any desired configuration to achieve a desired multiple cell image in either the reflective or transmissive modes hereof. In all of the aforementioned embodiments, or in various combinations thereof, it will be appreciated that the imaging cells of the present invention may be used to create any desired figure or character in any language or number system or any other desired design or image according to the application desired by its user.

The following examples further specifically define the present invention with respect to the transformation of a liquid crystalline composition from a focal-conic texture state into the A.C. electrical field induced Grandjean texture state. Parts and percentages are by weight unless otherwise indicated. The examples below are intended to illustrate various preferred embodiments of the novel liquid crystalline electro-optic system.

EXAMPLE I

An electro-optic liquid crystalline cell is prepared by providing a tin oxide coated glass slide, providing on the conductive side of said slide an about ½ mil thick spacer gasket of Tedlar, a polyvinylfluoride resin film available from Dupont, having a small, square opening cut therein, and a second tin oxide coated glass slide over the spacer gasket and enclosing a liquid crystalline composition having cholesteric optical characteristics between the conductively coated slides and within the opening in the spacer gasket. The liquid crystalline composition is prepared by mixing about 50 percent cholesteryl oleyl carbonate and about 50 percent anisylidene-p-n-butylaniline (hereafter ABUTA), and the composition is placed in the cell during cell fabrication. This is a room temperature liquid crystalline composition. The electrically conductive tin oxide coatings of the two slide electrodes are electrically connected to circuitry including a Hewlett-Packard 150 signal generator, available from Hewlett-Packard Corp., Palo Alto, Calif., and a Bogen amplifier, available from Bogen, Inc., Chicago, Ill. This circuit is suitable for providing A.C. or D.C. electrical fields across the electrodes. The liquid crystalline composition having cholesteric optical characteristics is provided in the focal-conic texture state by a D.C. electrical field.

An A.C. electrical field of field strength of about 2.5 × $10^5 V_{rms}$/cm, and of frequency of about 100Hz, thereby transforming the composition into the Grandjean texture state.

The advantageous effects of the transformation are observed by placing the electro-optic cell between nicols (polarizers) and observing it in transmitted collimated or convergent light in a Leitz polarizing microscope. In collimated white light the field of view becomes uniformly colored at the onset of optical activity characteristic of the transformed Grandjean state. In convergent light a uniaxial negative interference figure is observed. The arms of the uniaxial cross do not reach the central area which retains the same hue observed in collimated light.

The transformed composition is observed in reflected light by the naked eye, and it exhibits the selective reflection color which is characteristic of the same composition which is placed in the Grandjean texture state by another means, here mechanical shearing. The 50—50 percent mixture of cholesteryl oleyl carbonate and ABUTA exhibits a green reflection color in the transformed Grandjean state. The transformed composition exhibits memory characteristics by maintaining the transformed Grandjean state.

EXAMPLES II – V

Electro-optic cells are prepared and uses as in Example I, using as the liquid crystalline composition having cholesteric optical characteristics:

II. About 20 percent cholesteryl oleyl carbonate and about 80 percent ABUTA;

III. About 30 percent cholesteryl oleyl carbonate and about 70 percent ABUTA;

IV. About 40 percent cholesteryl oleyl carbonate and about 60 percent ABUTA;

V. About 60 percent cholesteryl oleyl carbonate and about 40 percent ABUTA.

The transformed Grandjean states exhibit selective reflection colors which change from reds to blues through the visible spectrum as the proportion of cholesteryl oleyl carbonate is increased in the composition. These cells exhibit memory characteristics.

EXAMPLES VI AND VII

Electro-optic cells are prepared and used as in Example I, using as the liquid the liquid crystalline composition having cholesteric optical characteristics:

VI About 50 percent cholesteryl erucate and about 50 percent ABUTA;

VII About 47 percent cholesteryl erucate and about 53 percent ABUTA.

The transformed Grandjean states exhibit green reflection colors. These cells exhibit memory characteristics.

Although specific components and proportions have been stated in the above description of the preferred embodiments of the advantageous liquid crystalline electro-optic system of the present invention, other suitable materials and variations of the various steps in the system as listed herein may be used with satisfactory results and various degrees of quality. In addition, other materials and steps may be added to those used herein and variations may be made in the process to synergize, enhance or otherwise modify the properties or or uses for the invention. For example, various other liquid crystalline compositions which will undergo the induced texture transformation and exhibit the accompanying advantageous optical effects may be discovered and used in the system of the present invention and such compositions may require somewhat different thicknesses, electrical fields, temperature ranges and other conditions for preferred results in accordance with the present invention. Likewise, various other means of creating electrical fields and other

What is claimed is:

1. A method for inducing the Grandjean texture state in a liquid crystalline composition, comprising:
providing a layer of liquid crystalline composition having cholesteric optical characteristics;
providing said composition layer in its focal-conic texture state; and
applying an A.C. electrical field to said composition layer, said A.C. electrical field having a frequency which is sufficient to suppress ion flow within the liquid crystalline composition, whereby said composition is transformed into the Grandjean texture state.

2. The method of claim 1 wherein the liquid crystalline composition having cholesteric optical characteristics comprises a mixture of a cholesteric liquid crystalline material and a material selected from the group consisting of: nematic liquid crystalline materials, smectic liquid crystalline materials, and mixtures thereof.

3. The method of claim 1 have the liquid crystalline composition comprises a material whose molecules have a net dipole moment which makes an acute angle in the range between about 45° and about 90° with the major molecular axis.

4. The method of claim 1 wherein the liquid crystalline composition comprises a material whose molecules have a permanent dipole moment which makes an acute angle in the range between about 45° and about 90° with the major molecular axis.

5. The method of claim 1 wherein the liquid crystalline composition comprises a material whose molecules have an electrically induced dipole moment which makes an acute angle in the range between about 45° and about 90° with the major molecular axis.

6. The method of claim 2 wherein the liquid crystalline composition comprises a material selected from the group consisting of: cholesteryl oleyl carbonate, cholesteryl erucate, and mixtures thereof.

7. The method of claim 2 wherein said liquid crystalline composition comprises anisylidene-p-n-butylaniline.

8. The method of claim 2 wherein said liquid crystalline composition comprises a mixture of cholesteryl oleyl carbonate and anisylidene-p-n-butylaniline wherein the cholesteryl oleyl carbonate comprises at least about 20 percent of said mixture.

9. The method of claim 1 wherein said A.C. electrical field is of field strength in the range between about $10^3$ Vrms/cm. and about $10^6$ Vrms/cm.

10. The method of claim 1 wherein said layer of liquid crystalline composition is of a thickness not greater than about 10 mils.

11. The method of claim 1 wherein said layer of liquid crystalline composition is of a thickness in the range between about one-half mil and about 5 mils.

12. The method of claim 1 further including viewing said layer of liquid crystalline composition with reflected light and the composition in the transformed Grandjean texture state exhibits a selective reflection color in the visible spectrum.

13. The method of claim 1 further including viewing said layer of liquid crystalline composition between plane polarizers in transmitted light.

14. The method of claim 1 further including viewing said layer of liquid crystalline composition with circular polarizers in transmitted light.

15. The method of claim 1 including providing said electrical field by a plurality of coplanar electrodes electrically connected to a source of A.C. electrical potential.

16. The method of claim 1 including providing said electrical field by at least two electrodes which are on opposite sides of the layer of liquid crystalline composition.

17. The method of claim 16 wherein at least one of said electrodes is substantially transparent.

18. An imaging method comprising the method of claim 1 wherein said layer of liquid crystalline composition is in image configuration.

19. The imaging method of claim 18 including viewing the layer of liquid crystalline composition between polarizers in transmitted light.

20. An imaging method comprising the steps of:
providing a layer of liquid crystalline composition having cholesteric optical characteristics,
providing said composition in its focal-conic texture state; and
applying an A.C. electrical field in imagewise configuration to said composition layer, said A.C. electrical field having a frequency which is sufficient to suppress ion flow within the image portions of the liquid crystalline layer thereby causing the composition in the image portions of said layer to be transformed into the Grandjean texture state whereby the image portions of said layer are distinguishable from the background portions of said layer.

21. The imaging method as defined in claim 20 including providing said electrical field by at least two electrodes which are on opposite side of the layer of liquid crystalline composition.

22. The imaging method as defined in claim 21 wherein at least one of said electrodes is shaped in image configuration.

23. The imaging method as defined in claim 21 wherein at least two electrodes on opposite sides of the layer of liquid crystalline composition are shaped in image configurations.

24. The imaging method of claim 22 wherein the imagewise electrode is accompanied by a coplanar imagewise electrode which is complementary to said imagewise electrode.

25. The imaging method of claim 22 wherein both electrodes are substantially transparent and including viewing the layer of liquid crystalline composition between polarizers in transmitted light.

26. The imaging method as defined in claim 20 including applying the A.C. electrical field to the layer of liquid crystalline composition by an A.C. electrically biased stylus.

27. The imaging method of claim 22 wherein said electrode in image configuration comprises a plurality of coplanar electrically conductive strips.

28. The imaging method of claim 27 including viewing the layer of liquid crystalline composition between polarizers in transmitted light.

* * * * *